(12) United States Patent
Gutmark et al.

(10) Patent No.: US 6,464,489 B1
(45) Date of Patent: Oct. 15, 2002

(54) METHOD AND APPARATUS FOR CONTROLLING THERMOACOUSTIC VIBRATIONS IN A COMBUSTION SYSTEM

(75) Inventors: Ephraim Gutmark, Baton Rouge, LA (US); Christian Oliver Paschereit, Baden; Wolfgang Weisenstein, Remetschwil, both of (CH)

(73) Assignee: Alstom, Paris (FR)

(*) Notice: Subject to any disclaimer, the term of this patent is extended or adjusted under 35 U.S.C. 154(b) by 0 days.

(21) Appl. No.: 09/404,820

(22) Filed: Sep. 24, 1999

Related U.S. Application Data

(63) Continuation-in-part of application No. 09/196,170, filed on Nov. 20, 1998.

(30) Foreign Application Priority Data

Nov. 24, 1997 (EP) .......................................... 97 810 902

(51) Int. Cl.⁷ ........................... F23C 11/04; F23D 21/00
(52) U.S. Cl. ............................... 431/1; 431/19; 431/79; 431/114; 60/725
(58) Field of Search .............................. 431/79, 114, 75, 431/76, 19, 78.1; 60/39.36, 725; 700/274; 381/71.1

(56) References Cited

U.S. PATENT DOCUMENTS

| | | | | |
|---|---|---|---|---|
| 2,807,931 A | * | 10/1957 | Bodine, Jr. ................... | 60/725 |
| 4,044,203 A | * | 8/1977 | Swinbanks .................... | 60/725 |
| 4,490,841 A | * | 12/1984 | Chaplin et al. ............... | 381/71 |
| 4,784,600 A | * | 11/1988 | Moreno ......................... | 431/9 |
| 4,801,261 A | * | 1/1989 | Hagar .......................... | 431/182 |
| 4,909,731 A | * | 3/1990 | Zinn et al. ..................... | 431/1 |
| 4,934,926 A | * | 6/1990 | Yamazaki et al. ............. | 431/79 |
| 5,169,302 A | * | 12/1992 | Keller .......................... | 431/350 |
| 5,211,705 A | * | 5/1993 | Hagar ........................... | 431/9 |
| 5,233,540 A | * | 8/1993 | Andersson et al. .......... | 364/508 |
| 5,249,954 A | * | 10/1993 | Allen et al. .................... | 431/75 |
| 5,299,930 A | * | 4/1994 | Weidman ...................... | 431/10 |
| 5,373,695 A | * | 12/1994 | Aigner et al. ................. | 60/725 |
| 5,428,951 A | * | 7/1995 | Wilson et al. ................. | 60/725 |
| 5,431,008 A | * | 7/1995 | Ross et al. ..................... | 60/725 |
| 5,575,144 A | * | 11/1996 | Brough ......................... | 60/725 |
| 5,676,538 A | * | 10/1997 | Lovett ........................... | 431/182 |
| 5,719,791 A | * | 2/1998 | Neumeier et al. ........... | 364/574 |
| 5,784,300 A | * | 7/1998 | Neumeier et al. ........... | 364/574 |
| 5,784,889 A | * | 7/1998 | Joos et al. ..................... | 60/725 |

OTHER PUBLICATIONS

C.O. Paschereit, I. Wygnanski, and H.E. Fiedler, "Experimental Investigation of Subharmonic Resonance in an Axisymmetric Jet", J. Fluid Mech. (1995), vol. 283, pp. 365–407.

E. Gutmark, C.O. Paschereit, W. Weisenstein, and B. Paikert, "Active Control of a Low Emission Swirl–Stabilised Combustor", In Bulletin of the American Physical Society / Division of Fluid Dynamics, Annual Meeting, San Francisco, California, USA, 1997, p. 1.

C.O. Paschereit, E. Gutmark, and W. Weisenstein, "Structure and Control of Thermoacoustic Instabilities in a Gas–Turbine Combustor", In 36$^{th}$ AIAA Aerospace Science Meeting and Exhibit, number AIAA paper 98–1067, Reno, Nevada, Jan. 12–15, 1998, pp. 1–9.

(List continued on next page.)

*Primary Examiner*—Henry Bennett
*Assistant Examiner*—Josiah C. Cocks
(74) *Attorney, Agent, or Firm*—Burns, Doane, Swecker & Mathis, L.L.P.

(57) ABSTRACT

In a method of controlling thermoacoustic vibrations in a combustion system having a combustion chamber and a burner, the fluid shear layer forming in the region of the burner is acoustically excited. An apparatus for controlling thermoacoustic vibrations in a combustion system having a combustion chamber and a burner is distinguished by the fact that device(s) for the acoustic excitation of the working gas are arranged in the region of the burner.

13 Claims, 10 Drawing Sheets

OTHER PUBLICATIONS

C.O. Paschereit, E. Gutmark, and W. Weisenstein, "Control of Thermoacoustic Instabilities and Emissions in an Industrial Type Gas–Turbine Combustor", In 27$^{th}$ International Symposium on Combustion, The Combustion Institute, Aug. 2–7, 1998, pp. 1–25.

C.O. Paschereit, E. Gutmark, and W. Weisenstein, "Role of Coherent Structures in Acoustic Combustion Control", In 29$^{th}$ AIAA Fluid Dynamics Conference, number AIAA Paper 98–2433, Albuquerque, New Mexico, Jun. 15–18, 1998, pp. 1–13.

C.O. Paschereit, E. Gutmark, and W. Weisenstein, "Flow–Acoustic Interactions as a Driving Mechanism for Thermoacoustic Instabilities", In 4$^{th}$ AIAA/CEAS Aeroacoustic Conference, number AIAA paper 98–2274, Toulouse, France, Jun. 2–4, 1998, pp. 1–13.

C.O. Paschereit, E. Gutmark, and W. Weisenstein, "Suppression of Combustion Instabilities by Acoustic Control of Shear Layer Properties", In U. Frisch, editor, Advances in Turbulence, pp. 293–296, Kluwer Academic Publishers, Dordrecht/Boston/London, 1998, pp. 1–4.

C.O. Paschereit, E. Gutmark, and W. Weisenstein, "Acoustic Control of Combustion Instabilities and Emissions in a Gas–Turbine Combustor", In Proceedings of the 1998 IEEE International Conference on Control Applications, Sep. 1–4, 1998, pp. 1–5.

C.O. Paschereit, E. Gutmark, and W. Weisenstein, "Structure and Control of Thermoacoustic Instabilities in a Gas–Turbine Combustor", Combustion, Science and Technology, 138:213–232, 1998, pp. 1–30.

E. Gutmark, C.O. Paschereit, and W. Weisenstein, "Sources and Control of Thermoacoustic Instabilities in Gas–Turbines", In Sixth International Congress on Sound and Vibration, Lyngby, Denmark, Jul. 5–8, 1999, pp. 1–8.

C.O. Paschereit, E. Gutmark, and W. Weisenstein, "Coherent Structures in Swirling Flows and Their Role in Acoustic Combustion Control", Accepted for publication in Physics of Fluids, 1999, pp. 1–42.

C.O. Paschereit, E. Gutmark, and W. Weisenstein, "Excitation of Thermoacoustic Instabilities by the Interaction of Acoustics and Unstable Swirling Flow", Submitted to AIAA Journal, 1999, pp. 1–41.

C.O. Paschereit, E. Gutmark, and W. Weisenstein, "Acoustic and Fuel Modulation Control For Reduction of Thermoacoustic Instabilities", In Fourteenth International Symposium on Airbreathing Engines, Florence, Italy, Sep. 5–10, 1999, pp. 1–8.

* cited by examiner

Velocity Profil:

—————— axial component       〰〰 shear layer

------ azimuthal component $\bar{u}$ = medium fluctuation velocity
r = jet radius
D = jet diameter
$\bar{U}_{jet}$ = medium jet velocity

METHOD AND APPARATUS FOR CONTROLLING THERMOACOUSTIC VIBRATIONS IN A COMBUSTION SYSTEM

This Application is a Continuation-in-Part application of U.S. patent application Ser. No. 09/196,170, which was filed Nov. 20, 1998 and which claims priority from European Patent Application No. 97 810 902.3, filed Nov. 24, 1997.

BACKGROUND OF THE INVENTION

1. Field of the Invention

The invention relates to a method and an apparatus for controlling thermoacoustic vibrations in a combustion system having a combustion chamber and a burner.

2. Background Art

Thermoacoustic vibrations represent a risk to every type of combustion application. They lead to pressure fluctuations of high amplitude and to a restriction in the operating range and may increase the emissions associated with the combustion. These problems occur in particular in combustion systems having low acoustic damping, as often represented by modern gas turbines.

In conventional combustion chambers, the cooling air flowing into the combustion chamber has a sound-damping effect and thus helps to dampen thermoacoustic vibrations. In order to achieve low $NO_x$ emissions, in modern gas turbines an increasing proportion of the air directed through the burners themselves and the cooling-air flow is reduced. Due to the accompanying lower sound damping, the problems referred to at the beginning in such modern combustion chambers accordingly occur to an increased extent.

One possibility of sound damping includes coupling Helmholtz dampers in the combustion-chamber dome or in the region of the cooling-air feed. However, if the space conditions are restricted, as are typical of modem combustion chambers of compact construction, the accommodation of such dampers may present difficulties and involves a high design cost.

SUMMARY OF THE INVENTION

Accordingly, one object of the invention is to provide a novel apparatus for controlling thermoacoustic vibrations, which apparatus effectively suppresses the thermoacoustic vibrations and involves as low a design cost as possible. Furthermore, an effective method of controlling thermoacoustic vibrations is to be provided.

In accordance with exemplary embodiments of the invention, this object is achieved by providing a method for controlling thermoacoustic vibrations in a combustion system having a combustion chamber and a burner and a working gas flowing through the combustion system. The vibrations are controlled by acoustically exciting a shear layer that forms in the working gas as the working gas flows through the combustion system. In accordance with exemplary embodiments of the invention, a mechanism is also provided for acoustically exciting the working gas in the combustion system to control the thermoacoustic vibrations. In accordance with exemplary embodiments of the invention, the mechanism is arranged in a region of the burner.

Coherent structures are of crucial importance during mixing actions between air and fuel. The spatial and time dynamics of these structures influence the combustion and heat release. The invention, then, is based on the idea of counteracting the formation of coherent structures. If the development of vortex structures at the burner outlet is reduced or prevented, the periodic heat-release fluctuation is also reduced as a result. Since the periodic heat-release fluctuations are the basis for the occurrence of thermoacoustic vibrations, the amplitude of the thermoacoustic vibrations is thereby reduced.

According to the invention, in the method of controlling thermoacoustic vibrations in a combustion system, the shear layer forming in the region of the burner is acoustically excited. Here, shear layer refers to the mixture layer which forms between two fluid flows of different velocity. Thus, shear layers are present in the mixing zones of two different fluid flows but also within one fluid flow when there are regions with changing or different velocities adjacent to each other, as e.g. in the center of a swirl flow or in the boundary layers of a fluid flow adjacent to a wall. The most relevant shear layers in the context of this invention are the boundary layers between two air-fuel-flows or between an air-fuel-flow and a (recirculating) exhaust gas flow. FIG. 1a is a schematic drawing of a combustion chamber showing the existence of typical shear layers within a combustion chamber. However, FIG. 1a does not—by far—show all shear layers which exist in a combustion chamber. Four types of shear layers are shown which are effected by a swirl-induced pipe flow (I), the deflection of the flow in front of the burner (II), separated flow regions in the corners of the combustion chamber with the corners of the combustion chamber being carried out as a shock diffuser (III) and the outlet flow of the recirculation zone of the combustor (IV). Accordingly, shear layers can result from velocity changes of the axial flow and from velocity changes of the azimuthal flow or from combinations thereof.

Influencing the shear layer has the advantage that excitations which are introduced are amplified in the shear layer. Therefore only a small amount of excitation energy is required in order to extinguish an existing sound field. Basic investigations have been conducted by the inventor and published e.g. in Paschereit C. O., et. al. 'Experimental investigation of subharmonic resonance in an axisymmetric jet', Journal of Fluid Mechanics, Volume 283, January 1995 which is incorporated by reference herewith. In these investigations a resonant subharmonic interaction between two axisymmetric traveling waves was induced in the shear layer of an axisymmetric jet by controlled sinusoidal perturbations of two frequencies. The measured results clearly indicate that both the fundamental wave and the subharmonic wave are greatly amplified as shown in FIG. 1b. FIG. 1b shows the development of the kinetic (in the direction of the x-axis) energy content of four frequency waves which were induced into the shear layers. The filled squares of FIG. 1b indicate the respective behavior of the subharmonic along the axial distance (direction of the x-axis) while the blank squares indicate the respective behavior of the fundamental frequency wave. The triangles show the behavior of further frequency waves (for 3/2 f and for the first harmonic 2 f with f being the fundamental frequency). It is clearly visible that the subharmonic rises most along the axis but also the fundamental frequency is greatly amplified. Furthermore, these investigations show that most of the energy for the resonant growth of the subharmonic originates from the mean flow. Contrasting with this is the principle of the antisound, in which an existing sound field is extinguished by a phase-displaced sound field of the same energy. In preliminary tests it was determined that it is very effective to control a combustion instability by affecting the evolution of the shear layer rather than to rely on anti-sound principles. The direct excitation of a shear layer benefits from the natural amplification of the flow within this shear layer and, thus, requires less energy to obtain the same effect as noise cancellation (with the latter also referred to as the anti-sound principle). By means of a simplifying calculation of the acoustic intensity it can be shown that the acoustic power in a combustor can be set to $$P=((p_{RMS})^2 \cdot A)/(\rho \cdot c)$$

where A is the area of the combustor cross section. With the following values for the nominal operating conditions of a typical combustor $p_{RMS}$=600 Pa
$\rho$=0.21 kg/m$^3$
c=800 m/s the acoustic power results to P~2.1 kW (Kilowatts). Thus, for a 50% suppression in pressure fluctuation amplitude, the loudspeaker should supply a power of 75% of the acoustic power measured in the combustion chamber, if one would rely on anti-sound principles. Driving the loudspeakers at a power of P=100 W (Watts) and assuming a 10% efficiency of the loudspeaker, the power fed into the combustion chamber is only 0.6% of the suppressed power. As a further driving mechanism, flame and fluid flow dynamics in the combustion chamber, in particular thermoacoustic instabilities, can also be induced by changes in equivalence ratio. However, a comparison between the estimated OH change during one cycle of oscillation and the measured value showed that the driving mechanism which is initiated by the equivalence ratio (e.g. by fuel injection modulation) only plays a secondary role to the main mechanism related to flow instabilities.

According to the invention, the shear layer can be excited both downstream and upstream of the burner. The shear layer can be directly excited downstream of the burner. During excitation upstream of the burner, the acoustic excitation is first of all introduced into the working gas, for example air, and is then transmitted to the shear layer after the working gas passes through the burner.

Since only small excitation outputs are required, the sound energy may be introduced into the flow, for example, by acoustic drivers, such as, for instance, loudspeakers.

Alternatively, vibrations may be excited mechanically in one or more chamber walls at the desired frequency.

The instantaneous acoustic excitation of the shear layer is preferably phase-coupled with a signal measured in the combustion system. In this case, a signal which is correlated with the thermoacoustic fluctuations is measured in the combustion system. This signal may be measured downstream of the burner in the combustion chamber or in a steadying chamber arranged upstream of the burner. Devices which control the instantaneous acoustic excitation as a function of the measuring signal are than preferably provided.

By the selection of a suitable phase difference between measuring signal and instantaneous acoustic excitation signal, which phase difference varies depending on the type of measured signal, the acoustic excitation counteracts the formation of coherent structures, so that the amplitude of the pressure pulsation is reduced.

A pressure signal which records the pressure fluctuations associated with the thermoacoustic vibrations is advantageously measured in the combustion system. This can be done, for instance, with one or more microphones arranged in the combustion chamber, in the steadying chamber or on a wall of one of the chambers.

Another possibility includes measuring an optical signal which is correlated with the heat-release fluctuations of the combustion process. In this case, a chemiluminescence emission is advantageously measured, preferably from one of the radicals OH or CH. An optical signal is recorded with a sensor for visible or infrared radiation, preferably an optical fiber probe.

The signal measured in the combustion system is advantageously filtered, phase-shifted and amplified, and the signal which is thus obtained is used as an input signal for an acoustic driver, which produces the instantaneous acoustic excitation of the shear layer. If necessary, the signal is amplified before the filtering. The filtering suppresses a disturbing noise signal and preferably includes a bandpass filter. The phase shift takes into account the fact that, as a rule, phase displacements occur due to the arrangement of the measuring sensors and acoustic drivers and due to the measuring instruments and the lines themselves. If the relative phase is selected in such a way that as large a reduction in the pressure amplitudes as possible is obtained, all of these phase-shifting effects are implicitly taken into account. The value of the phase shift, after determining a favorable value, may remain fixed. However, since the most favorable relative phase can change with time, the relative phase remains advantageously variable and is matched, for instance by controlling the pressure fluctuations, in such a way that considerable suppression is always ensured.

The acoustic driver may be an acoustic driver put into the gas flow, such as, for instance, a loudspeaker. Alternatively, the acoustic excitation of the shear layer is effected by a mechanical excitation of the walls of the combustion or steadying chamber.

DESCRIPTION OF THE PREFERRED EMBODIMENTS

Figure 1A:
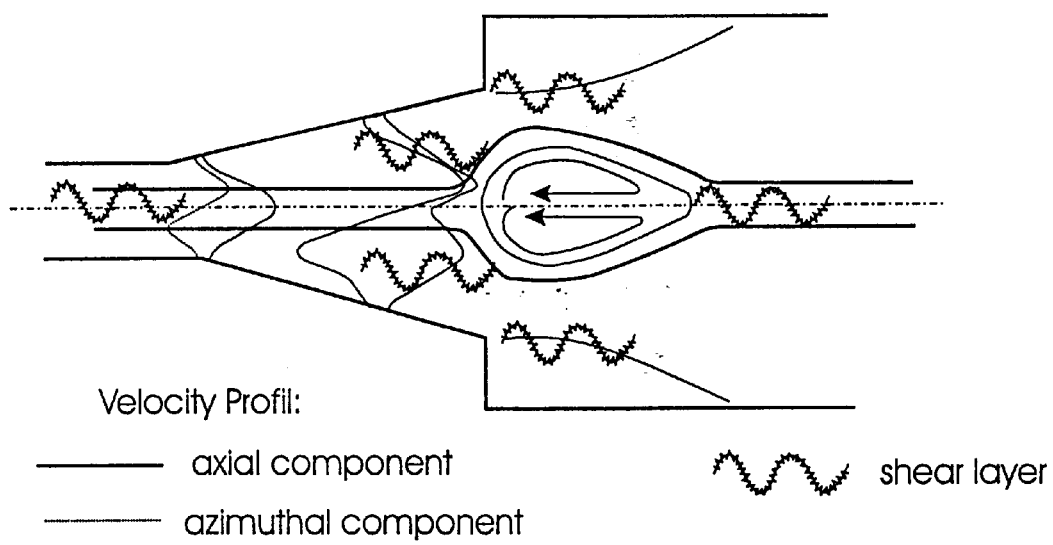
FIG. 1a schematically shows the existence of several shear layers in a combustor.
Figure 1B:
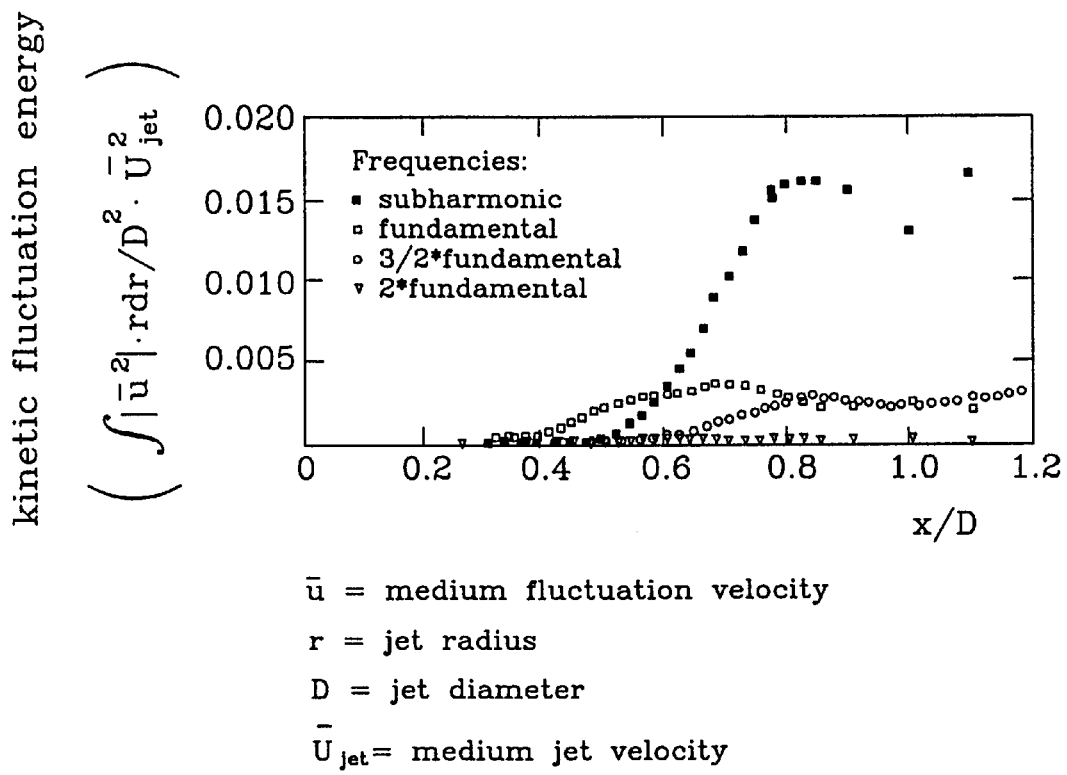
FIG. 1b shows, for an axisymmetric jet, the growth of waves of different frequencies when controlled sinusoidal perturbations are induced into the flow.
Figure 2:
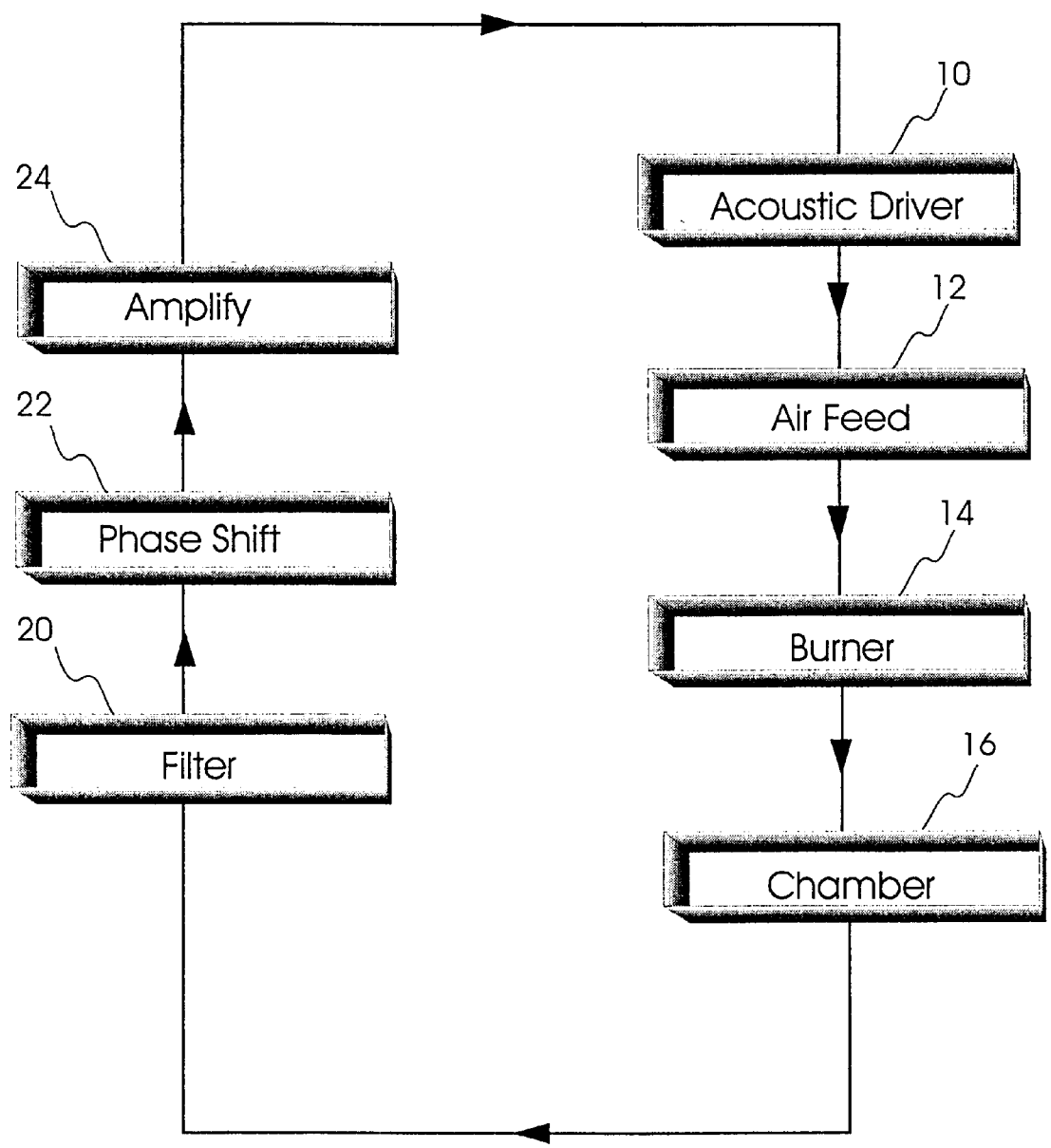
FIG. 2 shows a signal flow diagram of an embodiment of the method according to the invention for controlling thermoacoustic vibrations.

Referring now to the drawings, wherein like reference numerals designate identical or corresponding parts throughout the views, an exemplary embodiment of the method according to the invention is explained with reference to a signal flow diagram (FIG. 2). To activate the acoustic driver 10, a closed control loop is used. For noise suppression, the pressure or luminescence signal measured in the combustion chamber 16 is filtered (reference numeral 20), phase-shifted (reference numeral 22) and amplified (reference numeral 24). In the signal flow diagram of FIG. 2, the acoustic driver 10 introduces the acoustic energy into the air feed 12, that is, into the flow upstream of the burner. If, for instance, the walls of the combustion-chamber are excited by the acoustic driver so as to vibrate, thereby introducing vibrations into the flow, element 12 of the signal flow diagram would not be required. The chamber 16, which in this case comprises the combustion chamber, is arranged adjacent to the burner 14. The measurement of the above mentioned pressure or luminescence signal takes place in one of the chambers of the combustion system (either in the plenum upstream of the combustor which serves for reduction of turbulence or in the combustion chamber itself). Thus, the control loop is closed.

Figure 3:
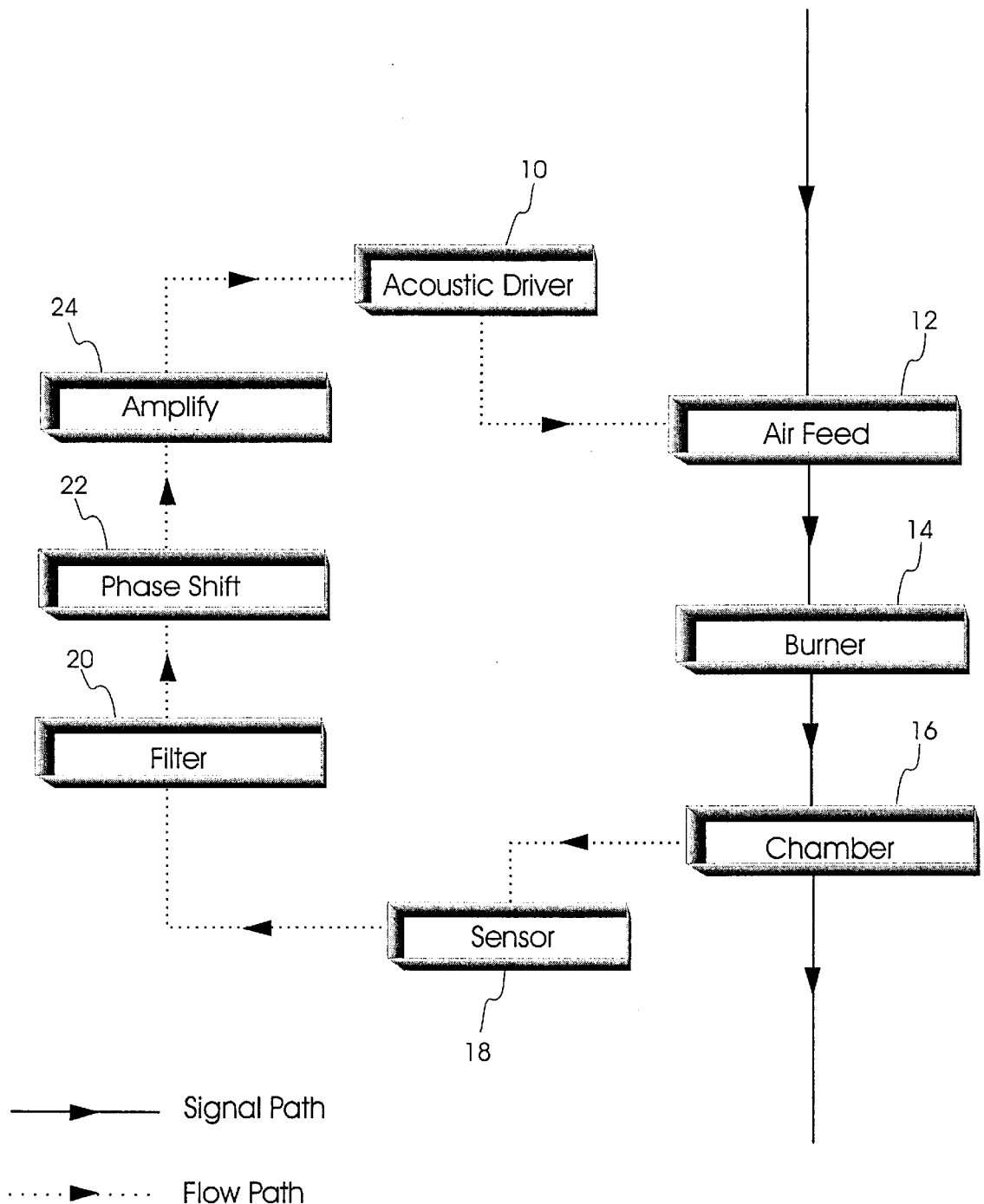
FIG. 3 shows a fluid flow diagram of an embodiment of the method according to the invention for controlling thermoacoustic vibrations.
Figure 4:
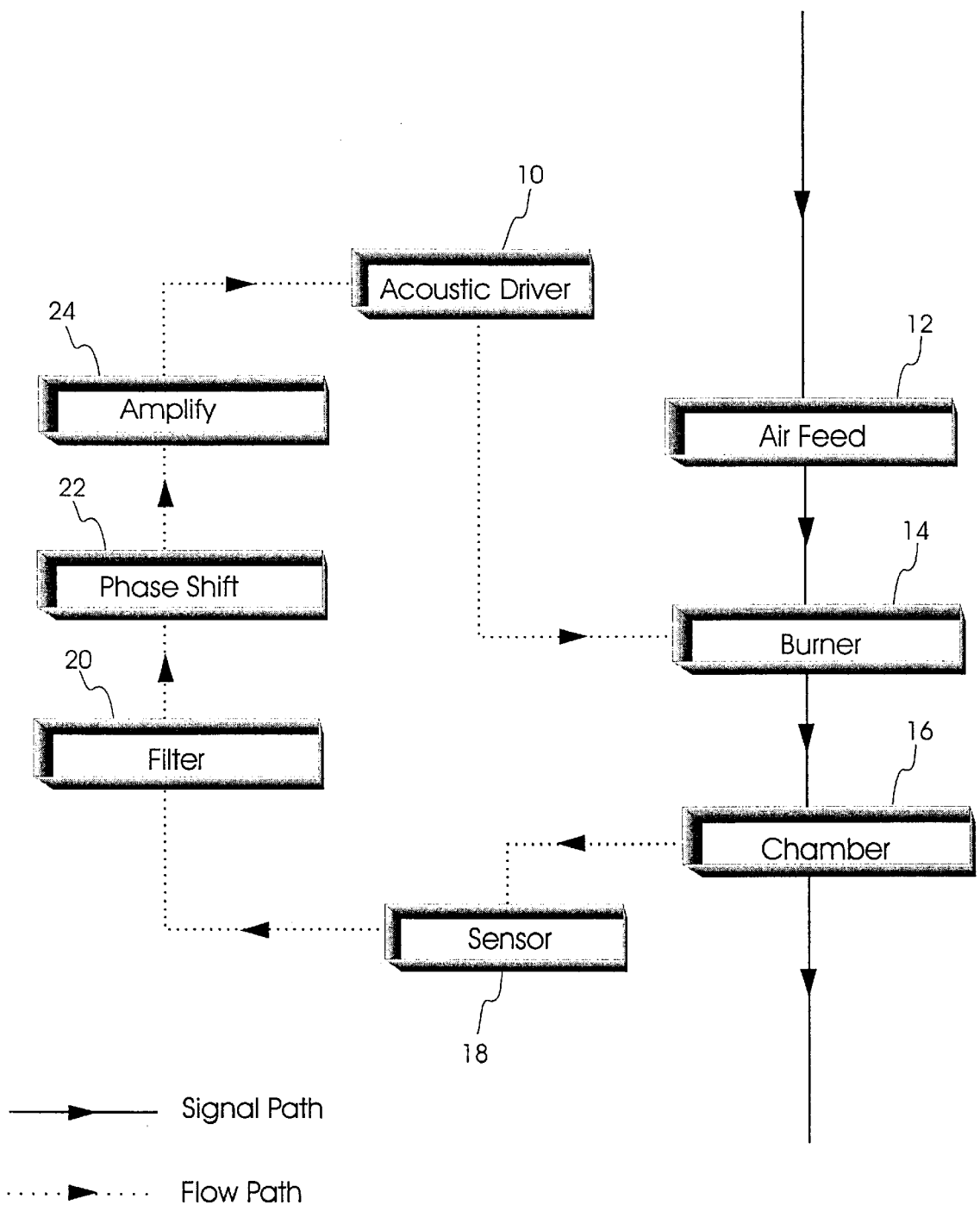
FIG. 4 shows a fluid flow diagram of a further embodiment of the method according to the invention for controlling thermoacoustic vibrations.

FIG. 3 and FIG. 4 show two possible arrangements of the controlling devices and the related signal path relative to the flow path of the working gas through the combustor. The flow path is indicated by a continuous line while the signal path is drawn in in dotted lines. The arrangement shown in FIG. 3 corresponds to the embodiment of FIG. 2. For determining the input signal of the control loop a sensor 18 is arranged in or adjacent to the combustion chamber 16 whereby the signal of this sensor is being measured and transferred to signal conditioning device(s). Alternatively it might be also appropriate—and in some cases it might be advantageous—to measure the control loop input signal within the burner 14 or even within the air feed 12 with lower temperatures of the working gas. The signal—e.g. a pressure signal which corresponds to the pressure fluctuations of the working gas in the combustion chamber 16 (a fluctuation value (RMS) would be sufficient for the purposes of the discussed instability control loop)—is then filtered (reference numeral 20), phase shifted (reference numeral 22) with an optimal phase shift adapted to the actual working condition (the relationship between working condition and optimal phase shift may be experimentally determined), amplified (reference numeral 24) by an appropriate amplification factor and finally fed into the acoustic driver device 10. The acoustic driver 10, e.g. one loudspeaker or a plurality of loudspeakers or one or more vibrating walls limiting the fluid flow path or even combinations thereof, acts on the fluid flow thereby inducing acoustic excitations of the shear layers. These acoustic excitations, i.e. pressure fluctuations particularly within the shear layer, grow from natural amplification, as discussed above, thereby superposing further pressure fluctuations which originally exist in the combustion chamber and would—in case of no control—lead to oscillations of the flow or even to flow instability. If an appropriate phase shift as well as an appropriate amplifying factor is chosen, the development of coherent structures in the combustion chamber is prevented or at least diminished by this superposition. This results in a more homogeneous temporal and spatial velocity and pressure profile of the fluid flow in the combustor and, thus, to a more homogeneous combustion process with reduced emission and increased efficiency.

The embodiment shown in FIG. 4 differs from the embodiment of FIG. 3 in that the acoustic driver 10 acts on the burner directly. This is effected by positioning the acoustic driver 10, e.g. a loudspeaker, in the burner 14 or immediately adjacent to the burner 14. The embodiment of the invention according to FIG. 3 is advantageous in that generated acoustic vibrations directly impact the flow in the burner 14. No damping of the induced acoustic excitations occurs due to the crossover between the air feed 12 and the burner 14/the combustion chamber 16. However, a shear layer, which exists in the air feed 12, or the respective flow with this respective flow later forming into a shear layer, is still underdeveloped in an earlier stage of evolution or formation. Thus, if the damping of an induced acoustic wave, in particular, due to the crossing over from the air feed 12 to the burner 14 or the combustion chamber 16, is smaller than the growth or the excitation of this acoustic wave when going through this flow section, it is more advantageous to position the actuator 10 so as to act on the air feed 12. Furthermore, any actuator positioned in the burner or immediately adjacent to the burner has to withstand very high temperatures.

In both cases the actuators have to be positioned so as to directly act on the evolving or existing shear layers of the fluid flow, thus, introducing—at least to a great extent—the acoustic excitations into these shear layers. Therefore, the optimal position for an actuator has to be determined for every combustor configuration separately, either experimentally or by flow calculations. For this it is advantageous to determine the position of the shear layers first.

Figure 5:
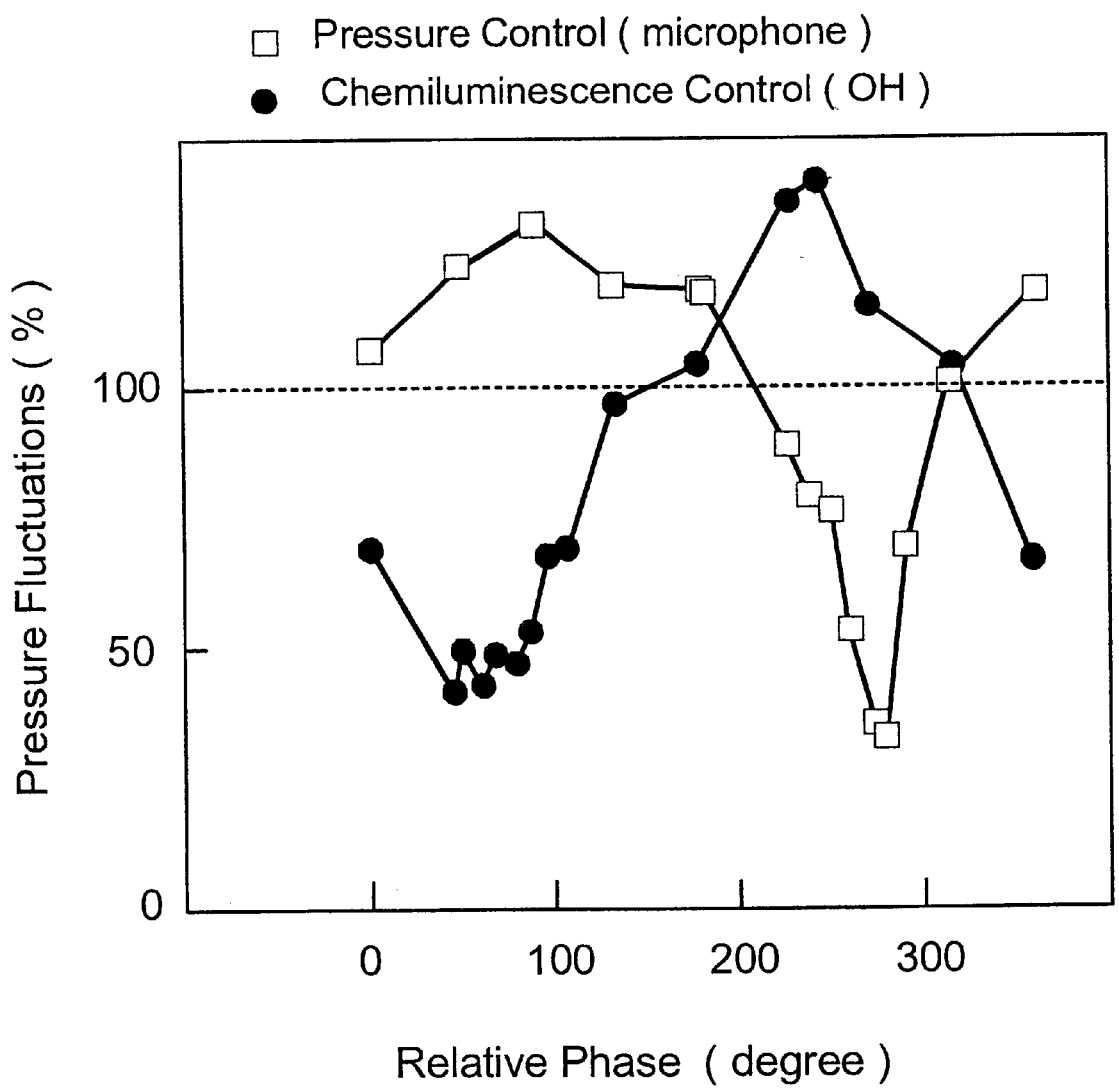
FIG. 5 shows, for an exemplary embodiment, a plot of the pressure fluctuations relative to the pressure fluctuations without control (100%) as a function of the relative phase between the measured measuring signal (sensor signal) and the instantaneous acoustic excitation.

In FIG. 5 the results of an experimental analysis of the pressure fluctuations in an exemplary embodiment of the invention, in which the combustion system was susceptible to axially symmetrical, thermoacoustic fluctuations at a frequency of 104 Hz, are depicted. The pressure fluctuations under control of a pressure signal (open squares) and of an OH luminescence signal (solid circles) relative to the pressure fluctuations without control (100%) are shown in FIG. 5. The acoustic excitation is effected by loudspeakers arranged inside the combustion system. Initial tests showed that an acoustic excitation upstream of the burner was more effective than an excitation downstream of the burner, so that the further experiments were carried out with acoustic excitation upstream of the burner.

In a first operating mode, a B&K water-cooled microphone recorded the acoustic resonances of the chamber. The signals were pre-amplified, bandpass-filtered and phase-shifted. In the process of determining the optimal phase shift, the phase shift was varied systematically between 0° and 360°. The resulting signal formed the trigger for a signal generator, which activated the loudspeaker via an audio amplifier. FIG. 5 shows that the pressure amplitudes are reduced by about 70% if a suitable relative phase is selected (open squares).

In a second operating mode, an OH chemiluminescence signal was recorded by two optical fiber probes as a measure of the heat-release rate. The signal of one of the probes, as described for the first operating mode, was utilized for the feedback. In the present exemplary embodiment, a reduction in the pressure amplitudes by about 60% was thus achieved (solid circles). According to present knowledge, the different values for the suppression are due to the reduced coherence of the combusting large scale structures which resulted in a deterioration of the OH signal when the controller became effective. The different phase angles at which the maximum suppressions were obtained for the microphone based system compared to the OH based controller are due to the different locations of the sensors (microphone or fiber probe) and the difference in the type of signals measured. So in this case, the phase of the pressure signal changed in axial direction because the end conditions were not fully reflecting. Therefore, the difference in the sensors' locations had an effect on the phase difference between the signals. In addition, a phase difference was introduced by the phase characteristics of the sensors themselves.

Figure 6:
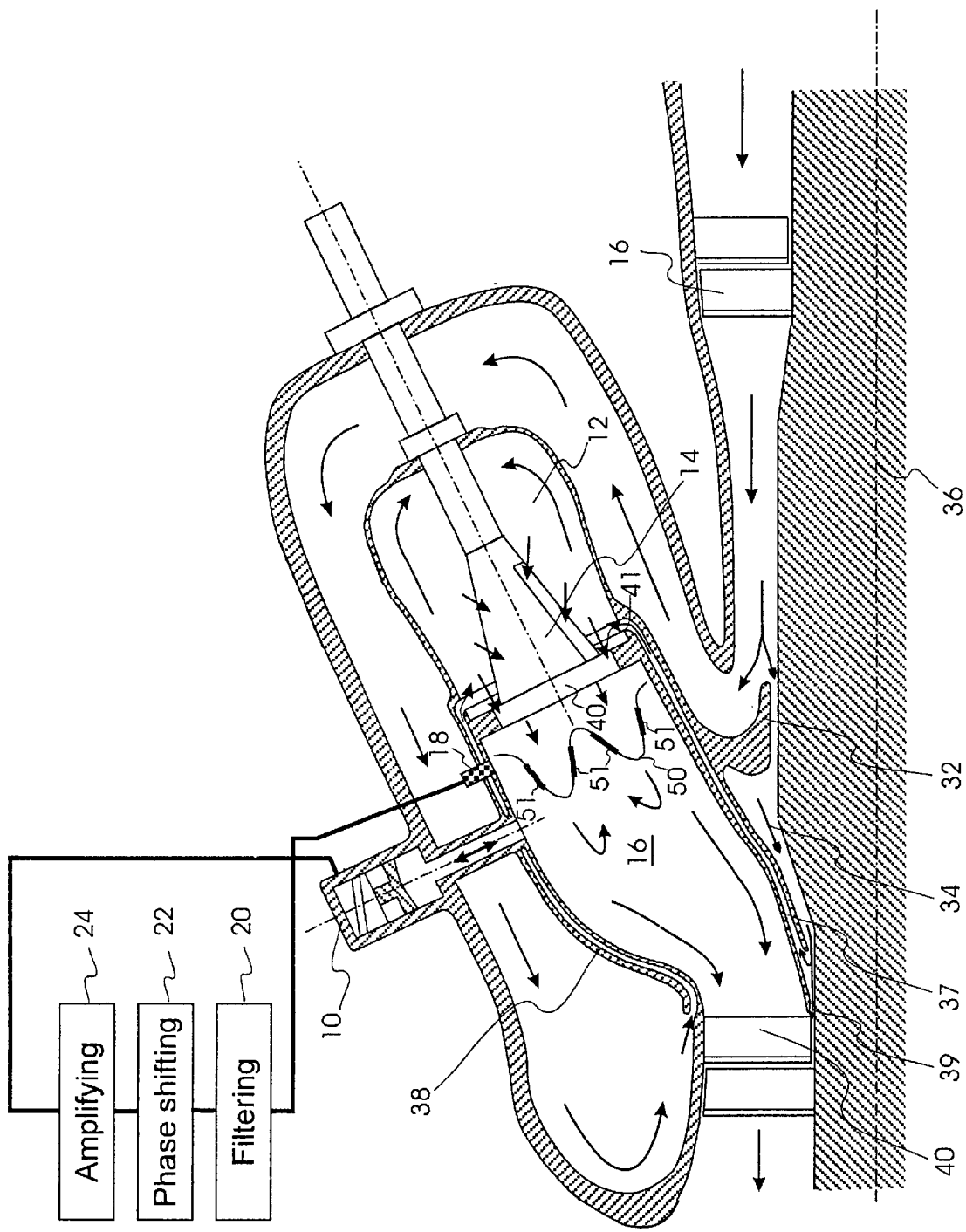
FIG. 6 shows an annular combustor carried out according to the invention.

FIG. 6 shows an annular combustor being carried out according to the invention. As indicated in FIG. 6 by arrows, the working gas, usually air, flows from the compressor 30 which is arranged upstream of the combustor to a splitter device 32 which divides the flow into two parts. The first part 34, i.e. the fluid which flows closer to the center line 36 of the turbomachine, is guided along a flow path to an axial position which is close to the exit plane of the combustor. Most of this first part fluid flow 34 is then reversed and guided along a small annular channel 37 back into the plenum 12 which is arranged ahead of the combustion chamber 16. Following this small channel 37 the fluid flow also serves as a coolant for cooling the combustor chamber walls. A small part of the first part fluid flow flows directly through a slit 39 into the outlet flow of the combustion chamber 16 thereby cooling the hub wall of the turbine inlet 40. The second part 35 of the fluid flow which is guided in a radial direction out of the center of the turbomachine flows in a first step along the inward outer side of the combustion chamber 16 and the plenum 12. The flow is then guided along the head of the plenum 12 and finally turns its flow direction again, thus, flowing along the outward outer side of the plenum 12 and the combustion chamber 16. In an axial plane close to the exit plane of the combustor the second part fluid flow 35 enters a second small annular channel 38 arranged on the outer side of the combustion chamber 16 and is guided into the plenum 12. The flow through this channel also serves as a coolant, thereby cooling the outer wall of the combustion chamber 16.

The plenum 12 of the combustor is separated from the combustion chamber 16 by the outlet of a burner 14. In FIG. 6 (as well as in the following figures) the burner 14 is only shown schematically and, thus, not in detail. However, the design of a burner is common knowledge to a skilled person. A typical burner, which e.g. would be suitable for use in this embodiment, is presented in the publications of Sattelmayer T. et.al. "Second-generation low-emission combustors for ABB gas turbines: burner development and test at atmospheric pressure", Journal of Engineering for Gas Turbines and Power, 114, 1992, which is incorporated with reference herewith. At least part of the working gas of the plenum is guided from the plenum 12 into the burner 14 thereby advantageously inducing swirl within the flow. In the burner 14 fuel is injected into the flow by means of a suitable injection device and mixed with the working gas.

The thus premixed flow finally enters the combustion chamber 16 wherein the combustion takes place. Additional working gas may enter the combustion chamber 16 through slits 41 arranged next to the orifice 40 of the burner. Furthermore depicted in FIG. 6 is the velocity profile 50 of the flow in the combustion chamber 16 in the direction of the combustion chamber axis. This velocity profile 50 shows two peaks of high velocity. Areas of slow velocity are present adjacent the walls of the combustion chamber 16 and in the center of the chamber. The latter area of slow velocity results from the recirculating flow within the combustion chamber 16 which is required for flame stabilizing purposes. Shear layers exist in regions of changing flow velocities of one fluid flow or of several fluid flows abutting each other. The most relevant shear layers 51 of the flow in the combustion chamber 16 in view of the invention are indicated in FIG. 6. Acoustic excitations for damping and controlling thermoacoustic vibrations of the flow should become effective in one or more of these layers 51, thereby, gaining profit from the natural amplification within these shear layers when going through the combustion chamber.

To achieve this control at least one acoustic driver 10 is installed in the combustor as shown in FIG. 6. Advantageously several acoustic drivers are—preferably equidistant—distributed around the circumference of the combustor. In FIG. 6 the acoustic driver/these acoustic drivers 10, in this case loudspeakers, is/are positioned so as to directly communicate with the flow in the combustion chamber 16. Thus, any acoustic vibrations generated by the acoustic drivers 10 are directly introduced into at least one of the depicted shear layers 51. To gain reasonable profit from the natural amplification of the shear layers the acoustic drivers have to be installed not too far downstream of the flow in the combustion chamber. Preferably, the acoustic drivers are installed within the first third of the axial length of the combustion chamber, most preferably within the first quarter. However, a position too close to the orifice of the premixing device could also be disadvantageous as the introduced acoustic vibrations could be extinguished at least to some extent by antagonistic flow phenomena, in particular the separated corner flow. Thus, the acoustic driver is preferably installed downstream around 10% of the axial length of the combustion chamber.

The working principle of the acoustic driver 10 of FIG. 6 is the same as of a normal loudspeaker. Thus, the acoustic driver is driven by an electric signal which according to the invention is generated from a sensor that records either pressure fluctuations or heat-release fluctuations in the combustion chamber. For this purpose in FIG. 6 a pressure sensor 18 is arranged upstream of the acoustic driver 10 with the pressure sensor 18 measuring the wall pressure. The pressure signal is converted into an electrical signal and transmitted to a signal conditioning device. This signal conditioning device includes a mechanism for filtering the signal (reference numeral 20), preferably bandpass-filtering, a mechanism for phase-shifting the signal (reference numeral 22) and, moreover, a mechanism for amplifying the filtered and phase-shifted signal (reference numeral 24). Preferably, this signal conditioning device comprises analogous components (filter-bank, etc.) or a micropocessor which is able to run the desired conditioning steps in real-time. For signal generation it is possible either to install only one sensor around the circumference of the combustor or to use a plurality of sensors distributed around the circumference of the combustor with each sensor being assigned to one acoustic driver. In the first case every acoustic device (in case there is more than one acoustic driver arranged) is supplied with the same driving signal. This driving signal can be phase-adapted according to the respective circumferential position of the acoustic driver for example in case of assuming a travelling sine-wave around the circumference. But with only one sensor it is not possible to take real two-dimensional effects into account. In the later case (when a plurality of sensors are arranged around the circumference) it is also possible to take two-dimensional effects into account. Thus, each acoustic driver can be driven in dependence on the local flow.

In general, it is desired to generate acoustic vibrations, that are introduced into the shear layers, by means of the acoustic devices in anti-phase to the pressure fluctuations which arise in the combustor fluid flow. Thus, any pressure oscillations due to eigenmodes of the combustor system or due to external or internal excitation shall be damped. By means of the effect of natural amplification of pressure fluctuations which are introduced into the shear layers of the combustor flow it is possible to damp pressure oscillations of the combustor flow by the input of acoustic vibrations with only a small energy content. This finally results in a more homogeneous combustor flow and, therefore, in a more homogeneous combustion with a reduced pollutant emission.

Figure 7:
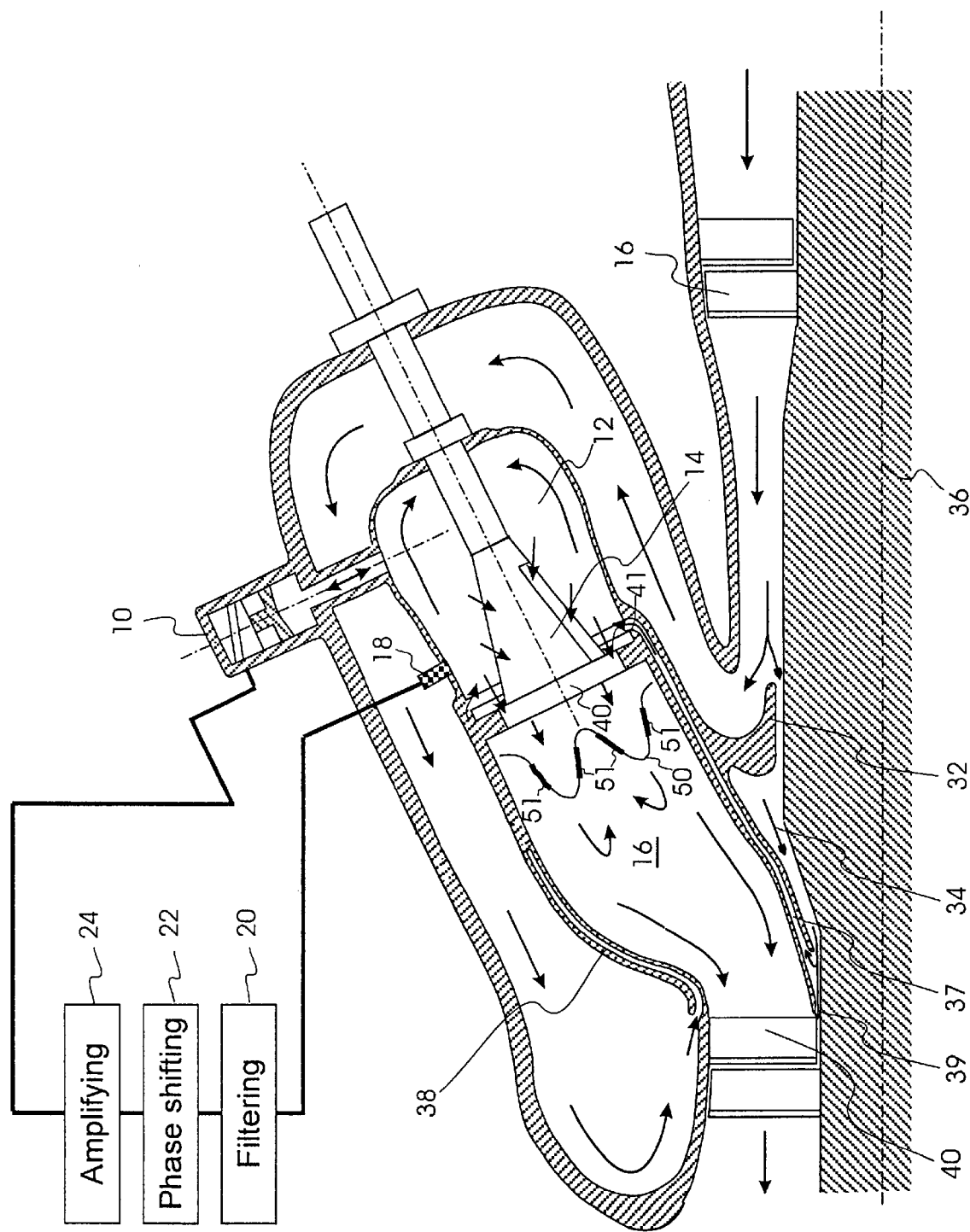
FIG. 7 shows a further annular combustor carried out according to the invention.

In FIG. 7 another, alternative embodiment of the invention is shown. The flow path of the annular combustor depicted in this figure as well as the premixing device (burner) correspond to the respective ones shown in FIG. 6. However, the acoustic driver 10 (in this case a loudspeaker; it might also be a movable side wall of the plenum) is arranged communicating with the plenum 12 instead of the combustion chamber 16. Also the pressure sensor 18 is positioned to measure pressure fluctuations within the plenum 12. The signal transfer and conditioning is the same as presented and discussed in FIG. 6. Also in this embodiment it is advantageous to distribute a plurality of acoustic drivers—preferably equidistantly—around the circumference of the combustor. For signal generation it is possible either to install only one sensor around the circumference of the combustor or to use a plurality of sensors distributed around the circumference of the combustor with each sensor being assigned to one acoustic driver.

This embodiment is advantageous in that the temperature of the fluid in the plenum 12 is much lower than of the fluid in the combustion chamber 16. Accordingly, the sensor 18 positioned adjacent the plenum 12 does not suffer the same high temperatures as when positioned adjacent the combustion chamber. Thus, this sensor will have a longer lifetime or can be cheaper in its design. The acoustic excitations of the acoustic driver 10 are fed into the plenum 12 and are transmitted to the shear layers which form either in the plenum or in the combustion chamber 16. Depending on the dissipation and, thus, the damping properties when the fluid crosses over from the plenum 12 to the combustion chamber 16, positioning of the acoustic driver and the sensor either communicating with the plenum or with the combustion chamber is more effective in terms of energy required to damp fluid oscillations. Accordingly, this positioning is dependent on the individual design of the respective combustor.

Figure 8:
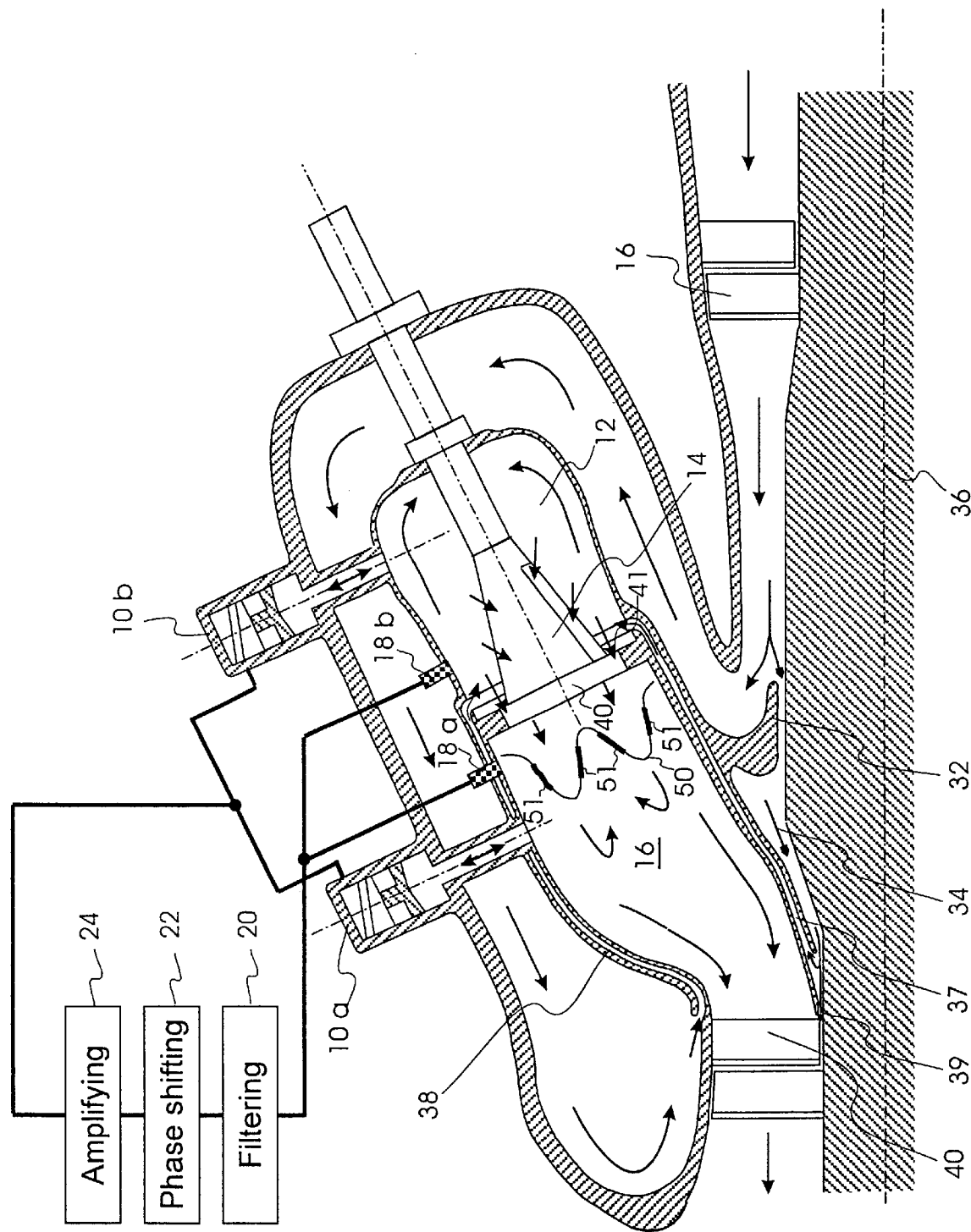
FIG. 8 shows a further annular combustor carried out according to the invention.

As shown in FIG. 8 it is also possible to combine both arrangements of the acoustic drivers and sensors presented in the FIGS. 6 and 7 in one embodiment. One acoustic driver 10b is arranged communicating with the plenum 12. One further acoustic driver 10a is arranged communicating with the combustion chamber 16. In a preferred embodiment of the invention each acoustic driver is individually driven by a signal which is generated by a separated sensor (18a, 18b). Therefore, a very effective and locally adapted damping of flow oscillations can be achieved.

Figure 9:
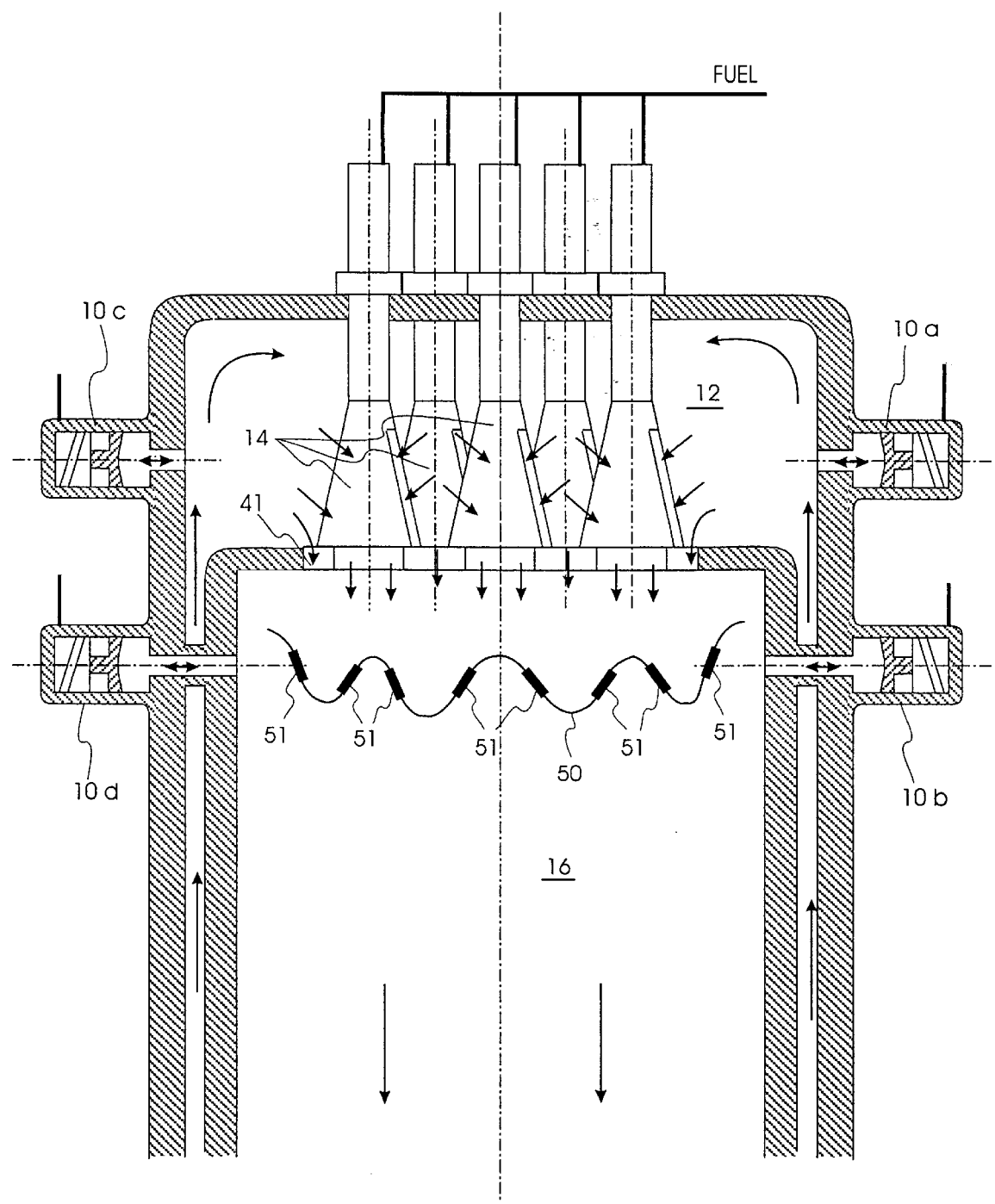
FIG. 9 shows a silo combustor carried out according to the invention.

In FIG. 9 a silo combustor is shown which is carried out according to the invention. The fluid flow to the combustor (usually air flow) is indicated by arrows. The fluid enters the combustion chamber either through the premixing devices 14 arranged on top of the combustion chamber 16 or through slits 41 next to the orifices 40 of the premixing devices 14. The premixing devices 14 which are only schematically shown in FIG. 9 are well known in the state of the art.

According to the invention four acoustic drivers 10a, 10b, 10c, 10d are arranged whereby two are in communication with the plenum 12 and two directly communicate with the combustion chamber 16. Again a plurality of acoustic drivers is preferably arranged on the circumference of the silo combustor. Not shown in FIG. 9, but realised in correspondence with the embodiments depicted in FIGS. 6, 7 and 8, are signal generating devices (one or more sensors and signal conditioning devices) for generating the driving signal for driving the acoustic drivers. The working principle of the acoustic drivers as well as the advantages is in parallel to the above discussed items.

Figure 10:
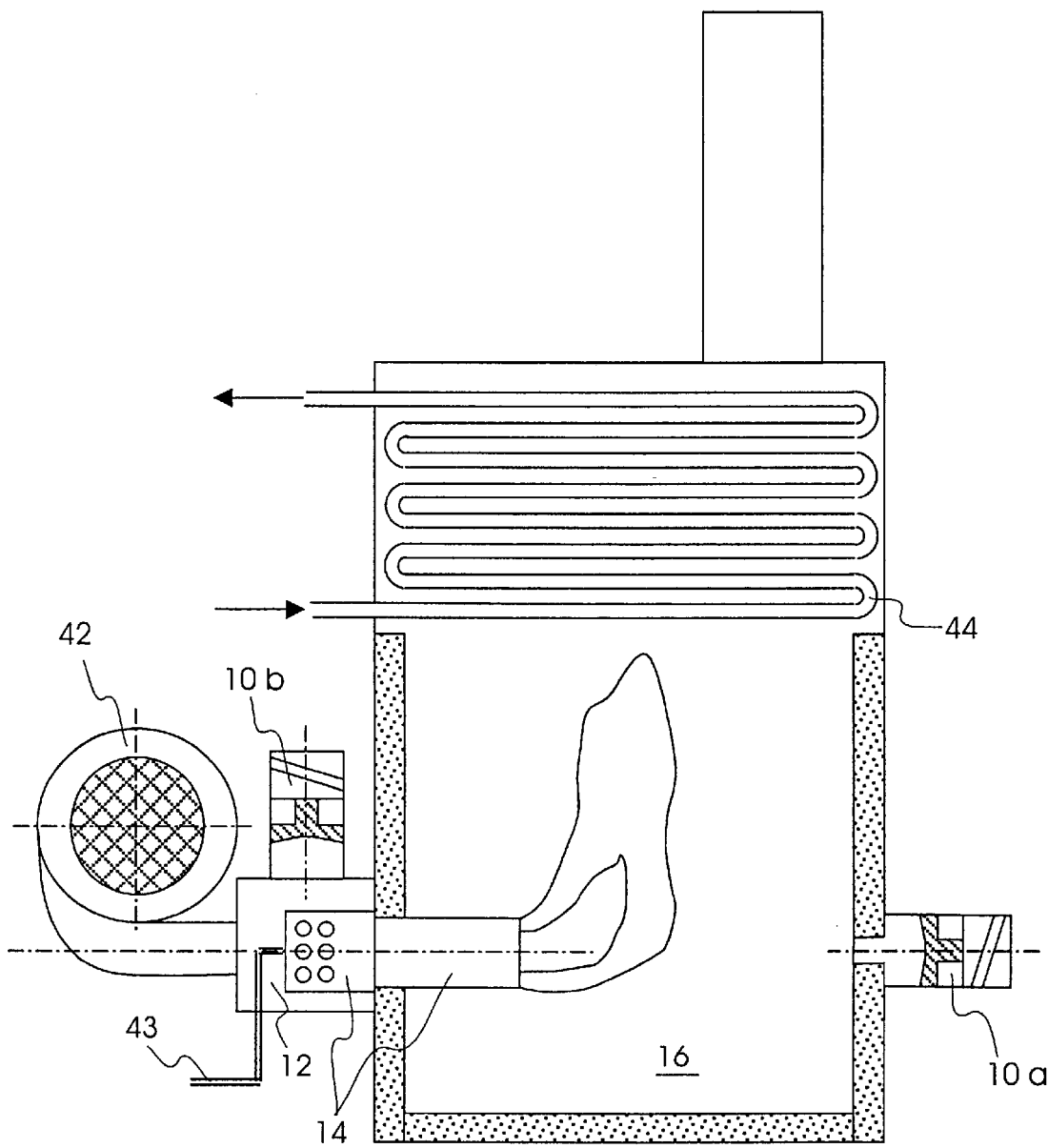
FIG. 10 shows a combustor of a heating boiler carried out according to the invention.

Moreover, a further preferred embodiment of the invention is shown in FIG. 8. Depicted in FIG. 8 is a combustor of a heating boiler which comprises an indraught 42, a small plenum 12, a fuel conduit 43, a premixing device 14, a combustion chamber 16 and heating pipes 44. The fuel is injected and mixed with air in the premixing device. The combustion takes place in the combustion chamber as indicated in FIG. 10. The combustor shown in FIG. 10 furthermore comprises two acoustic drivers 10a, 10b. One acoustic driver 10b is positioned next to the plenum 12 being in communication with the fluid in this plenum 12. Thus, acoustic excitations are introduced into the gas flow in the plenum. These acoustic vibrations are transferred through the premixing device 14 into the combustion chamber 16. Accordingly, any shear layers evolving in the combustion chamber 16 are already superposed by these acoustic vibrations. In this combustion chamber shear layers evolve in particular as a consequence of the jet-type outflow of the fluid flow out of the premixing device 14 and as a consequence of the turning of the flow in the combustion chamber 16. Thus, it is also appropriate and advantageous—as shown in FIG. 10—to arrange one or more acoustic drivers 10a so that they are in direct communication with the combustion chamber 16. According to the invention the two acoustic drivers shown in FIG. 10 can either be arranged in combination with each other or in an arrangement of only one acoustic driver. Not shown in FIG. 10 are the signal generating devices (signal sensor and signal conditioning device) which are carried out in parallel to the embodiments shown in FIGS. 6 to 8.

Obviously, numerous modifications and variations of the present invention are possible in light of the above teachings. It is therefore to be understood that, within the scope of the appended claims, that the invention may be practiced other than as specifically described herein.

What is claimed is:

1. A method of suppressing thermoacoustic vibrations in a combustion system having a combustion chamber, a plenum arranged upstream of the combustion chamber, a burner arranged between the combustion chamber and the plenum, and a working gas flowing through the combustion system, wherein a shear layer forms in the working gas as the working gas flows through the combustion system, comprising the steps of:

acoustically exciting the shear layer with the acoustic excitation of the shear layer being instantaneous; and phase coupling the acoustic excitation with a signal measured in the combustion system;

wherein the step of acoustically exciting the shear layer comprises introducing the acoustic excitation into the combustion system at the plenum.

2. The method as claimed in claim 1, wherein the shear layer excitation is effected in a first third of the combustion chamber.

3. The method as claimed in claim 1, further comprising the steps of:

filtering, phase-shifting and amplifying the signal measured in the combustion system; and driving an acoustic source with the filtered, phase-shifted and amplified signal to produce the instantaneous acoustic excitation of the shear layer.

4. The method as claimed in claim 3, further comprising the step of acoustically exciting the shear layer by exciting a membrane of a loudspeaker as an acoustic source.

5. The method as claimed in claim 1, wherein the signal measured in the combustion system is a pressure signal.

6. The method as claimed in claim 1, wherein the signal measured in the combustion system is a chemiluminescence signal.

7. The method of claim 6, wherein the chemiluminescence signal is from an emission of a CH radical.

8. The method as claimed in claim 1, wherein the signal measured in the combustion system is measured in one of the combustion chamber and a plenum of the combustion system.

9. The method as claimed in claim 1, further comprising the step of acoustically exciting the shear layer by mechanically exciting walls of the combustion-chamber.

10. An apparatus for suppressing fluid pressure oscillations in a combustion system having a plenum, a combustion chamber and a burner, the burner being located upstream of the combustion chamber and between the combustion chamber and the plenum, the apparatus comprising:

a first mechanism for acoustically exciting shear layers of a working gas in the combustion system, the mechanism being arranged in acoustic communication with the plenum;

at least one first sensor arranged to measure pressure fluctuations within the plenum; and a first controller for controlling the first mechanism as a function of a signal output from the at least one first sensor, to suppress acoustic vibrations in the combustion system.

11. The method of claim 2, wherein the shear layer excitation is introduced into the combustion system in a region of the combustion chamber after a first tenth, and within a first third, of the combustion chamber.

12. The apparatus of claim 10, further comprising a second mechanism for acoustically exciting a shear layer of a working gas in the combustion system, the second mechanism being arranged in acoustic communication with a first third of an axial length of the combustion chamber;

at least one second sensor arranged in the combustion system, wherein the at least one second sensor measures thermoacoustic vibrations; and a second controller for controlling the second mechanism as a function of a signal output from the at least one second sensor, to suppress thermoacoustic vibrations in the combustion system.

13. The apparatus of claim 12, wherein the first and second controllers are the same controller.

* * * * *